United States Patent [19]

Breckenridge et al.

[11] Patent Number: 5,265,034

[45] Date of Patent: Nov. 23, 1993

[54] FEEDBACK CONTROLLED OPTICS WITH WAVEFRONT COMPENSATION

[75] Inventors: William G. Breckenridge; David C. Redding, both of Pasadena, Calif.

[73] Assignee: The United States of America as represented by the Administrator of the National Aeronautics and Space Administration, Washington, D.C.

[21] Appl. No.: 700,379

[22] Filed: May 13, 1991

[51] Int. Cl.⁵ .......................... G02B 5/10; G06F 15/20
[52] U.S. Cl. ..................................... 364/525; 364/559; 364/148; 359/849; 250/201.1; 250/201.9
[58] Field of Search ............... 364/525, 559, 578, 148, 364/149, 150, 158, 167.01; 250/201.1, 201.9; 359/843, 849, 846; 356/353, 359, 361, 363

[56] References Cited

U.S. PATENT DOCUMENTS

| | | | |
|---|---|---|---|
| 3,261,016 | 7/1966 | Burr | 359/849 |
| 3,620,606 | 11/1971 | Tschunko | 359/849 |
| 3,891,836 | 6/1975 | Lee | 235/151.12 |
| 3,920,965 | 11/1975 | Sohrwardy | 235/150.1 |
| 3,967,899 | 7/1976 | O'Meara | 359/849 |
| 4,093,351 | 6/1978 | Perkins et al. | 359/849 |
| 4,309,602 | 1/1982 | Gonsalves et al. | 250/201.9 |
| 4,349,869 | 9/1982 | Prett et al. | 364/159 |
| 4,471,447 | 9/1984 | Williams et al. | 364/525 |
| 4,471,448 | 9/1984 | Williams | 364/525 |
| 4,698,745 | 10/1987 | Hiroi et al. | 364/165 |
| 4,725,942 | 2/1988 | Osuka | 364/150 |
| 4,736,316 | 4/1988 | Wallman | 364/149 |
| 4,737,621 | 4/1988 | Gonsiorowski et al. | 250/201.9 |
| 4,744,511 | 5/1988 | Kakehi et al. | 236/13 |
| 4,825,062 | 4/1989 | Rather et al. | 359/849 |
| 4,865,423 | 9/1989 | Doi | 350/320 |
| 4,865,454 | 9/1989 | Lazzarini et al. | 250/201.9 |
| 4,904,912 | 2/1990 | Yamamoto | 318/561 |
| 4,946,280 | 8/1990 | Horton | 356/353 |
| 5,109,349 | 4/1982 | Ulich et al. | 364/525 |
| 5,113,064 | 5/1992 | Manhart | 250/201.9 |
| 5,124,542 | 6/1992 | Wortheimer | 250/201.9 |
| 5,128,530 | 7/1992 | Ellerbroek et al. | 250/201.9 |

OTHER PUBLICATIONS

T. S. Mast and J. E. Nelson, "The Figure Control of Segmented Telescope Mirrors," *Ten-Meter Telescope Report No. 80*, Mar., 1983.

J. N. Aubrun, K. R. Lorell, T. S. Mast and J. E. Nelson, "Dynamic Analysis of the Actively Controlled Segmented Mirror of the W. M. Keck Ten-Meter Telescope", *IEEE Control Systems Magazine*, Dec., 1987.

R. Laskin, W. Breckenridge, M. Shao and D. Redding, "Calibration and Operation of a Large Space-Based Optical Interferometer", *AAS Guidance and Control Conference Paper No. AAS 90-040*, Keystone Colo., Feb. 3, 1990.

D. Redding et al., "Linearized Ray-Trace Analysis," *International Lens Design Conference*, Jun. 1990.

Hudgin; "Wave-Front Compensation Error due to finite corrector-element size"; Journal Optical Society, vol. 67, No. 3, Mar. 1977.

*Primary Examiner*—Jack B. Harvey
*Assistant Examiner*—Ellis B. Ramirez
*Attorney, Agent, or Firm*—John H. Kusmiss; Thomas H. Jones; Guy M. Miller

[57] ABSTRACT

The sensitivity model of a complex optical system obtained by linear ray tracing is used to compute a control gain matrix by imposing the mathematical condition for minimizing the total wavefront error at the optical system's exit pupil. The most recent deformations or error states of the controlled segments or optical surfaces of the system are then assembled as an error vector, and the error vector is transformed by the control gain matrix to produce the exact control variables which will minimize the total wavefront error at the exit pupil of the optical system. These exact control variables are then applied to the actuators controlling the various optical surfaces in the system, causing the immediate reduction in total wavefront error observed at the exit pupil of the optical system.

12 Claims, 4 Drawing Sheets

FEEDBACK CONTROLLED OPTICS WITH WAVEFRONT COMPENSATION

ORIGIN OF THE INVENTION

The invention described herein was made in the performance of work under a NASA contract, and is subject to the provisions of Public Law 96-517 (35 USC 202) in which the Contractor has elected not to retain title.

BACKGROUND OF THE INVENTION

1. Technical Field

The invention relates to precision optical devices such as astronomical reflecting telescopes with many reflecting or refracting surfaces whose deformations are to be compensated in order to maximize image quality. In particular, the invention relates to a feedback control system which computes in a single linear computation the exact set of actuator commands which minimize the total wavefront error at the telescope objective (output) for a given set of measured deformations of the reflecting or refracting surfaces of the optical device.

2. Background Art

Image quality in powerful optical devices such as interstellar reflecting telescopes is impaired by deformation of the reflecting and refracting optical surfaces in the telescope. Deformation of the optical surfaces due, for example, to temperature variations, vibration, etc., is unavoidable, and must be compensated if image quality is to be maximized. Such compensation ideally should be performed quickly in real time to permit rapid repetitive compensation in order to maintain maximum image quality at all times through varying conditions.

Alignment of a complex optical system is a related problem. U.S. Pat. Nos. 4,471,447 and 4,471,448 to Williams et al. and Williams, respectively, disclose a method for aligning a complex optical system in which the desired adjustment of all of the controlled optical surfaces is computed using a numerical regression estimation technique. In essence, this technique perturbs the alignment parameters in a model of the complex optical system in successive trial-and-error attempts to degrade the model and duplicate the distortion actually observed in the (objective) output image of the optical system. After many such attempts, the observed distortion is ultimately duplicated in the model, and the values to which the alignment parameters of the model have been last perturbed are used to calculate the alignment errors in the controlled optical surfaces of the complex optical systems. The alignment errors are then corrected.

The problem with such a technique is that the numerical regression process is so time-consuming that its use for anything other than initial optical alignment is impractical. During operation, the corrections would be performed so slowly using such a technique that they would not keep up with the continuing perturbations of the optical surfaces and in essence would be of no practical effect on image quality. Thus, it has not seemed possible to compensate for deformation of the optical surfaces in a complex optical system in real time.

A related problem is that the regressive estimation approach of such a technique by definition does not yield the exact answer after a limited number of iterations, and therefore provides inexact compensation for the deformation or movement of the optical surfaces in a complex optical system.

Accordingly, it is an object of the invention to provide a feedback control system for maintaining optical alignment in a complex optical system in real time.

It is a further object of the invention to perform a single rapid computation of the exact alignment corrections for all controlled optical elements in the optical system to minimize the total wavefront error at the objective (output) of the optical system.

DISCLOSURE OF THE INVENTION

A model of the optical system is formulated from the design of the system optical geometry and characteristics. This model defines the system's objective function (image output) in terms of deformations (error states) of the various segments or optical surfaces in the system and the actions or control variables of all of the actuators controlling the optical surfaces. (In the preferred embodiment, the objective function is the total wavefront error squared at the exit pupil of the optical system, the error states are 6 degree of freedom (DOF) rotational and translational motions of each of the optical surfaces and the control variables are the 3 DOF (tilt, tip and piston) of the actuators controlling each of the optical surfaces. The wavefront error for each ray is its optical path differene with respect to an ideal or unperturbed state of the system.) A sensitivity model is formed by taking the derivatives of the objective function with respect to the error states and control variables. The sensitivity model is a linear model of the influence of the error states and control variables on the objective function. In one embodiment of the invention, the sensitivity model is then used to compute an actuator control gain matrix by imposing the mathematical condition for minimizing the total wavefront error at the exit pupil. The most recent deformations or error states of the controlled segments or optical surfaces of the system are then assembled as an error vector, and the error vector is transformed by the control gain matrix to produce the exact control variables which will minimize the total wavefront error at the exit pupil of the optical system. These exact control variables are then applied to the actuators controlling the various optical surfaces in the system, causing the immediate reduction in total wavefront error observed at the exit pupil of the optical system. In one embodiment of the invention, the sensitivity matrix is updated based upon the changes attributable to the most recent change in the control variables, and the entire control process is then repeated.

The advantage of the invention is that each time the sensors sample the deformations of all the controlled optical surfaces of the system, the measured error states are multiplied by the gain matrix in a single calculation to provide, in a nearly instantaneous fashion, the exact values of the control variable which will minmize the total wavefront error at the exit pupil. Thus, the invention provides an exact control solution in nearly instantaneous fashion.

BRIEF DESCRIPTION OF THE DRAWINGS

Preferred embodiments of the invention are described in detail below with reference to the accompanying drawings, of which.

MODES FOR CARRYING OUT THE INVENTION

Figure 1:
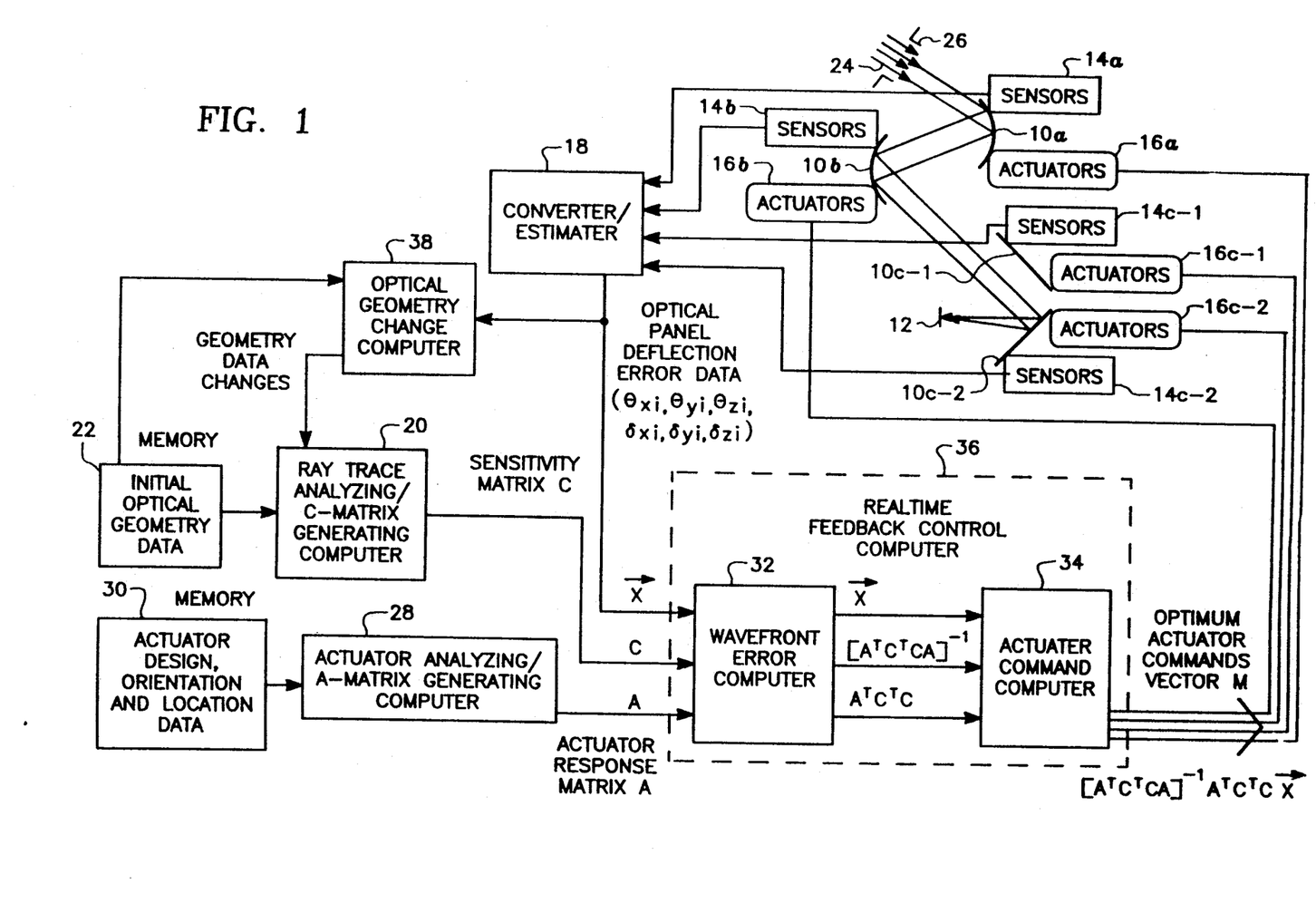
FIG. 1 is a simplified block diagram illustrating the concept of the feedback control system of the invention.

The broad concept of the invention is illustrated in FIG. 1. A complex optical system has a set of optical surfaces 10a, 10b, 10c, the optical surface 10c consisting of two segments 10c-1 and 10c-2 and an exit pupil 12. Each optical surface 10 has its own set of deformation/movement sensors 14 and its own set of actuators 16. For example, the optical surface 10a has a set of sensors 14a which detect motion in six degrees of freedom by the optical surface 10a, namely translation along three orthogonal axes and rotation about each of the axes. The remaining sensors 14b, 14c-1 and 14c-2 perform corresponding functions in relation to the optical surfaces 10b, 10c-1 and 10c-2, respectively. In a preferred embodiment, the optical surface 10a is controlled by a set of actuators 16a which control rotation about two of the orthogonal axes most nearly parallel to the tangential plane of the optical surface 10 and translation along the remaining orthogonal axis, which is normal to the tangential plane. The remaining actuators 16b, 16c-1 and 16c-2 perform corresponding functions in relation to the optical surfaces 10b, 10c-1 and 10c-2, respectively.

A converter/estimator 18 converts the analog outputs of the sensors 14 to digital representations of the actual movements by the respective optical surfaces, comprising deflection or deformation error data. The error data for the $i^{th}$ one of the optical surfaces 10 comprises the rotations $\theta_x(i)$, $\theta_y(i)$, $\theta_z(i)$ about orthogonal x, y and z axes and the translations $\delta_x(i)$, $\delta_y(i)$, $\delta_z(i)$ along the same axes, respectively. The error data for all optical surfaces 10 is assembled into a single error vector $\bar{x}$.

A sensitivity matrix generating computer 20 retrieves from a memory 22 the optical geometry design data specifying the initial shape, optical characteristics, correct or unperturbed location and correct orientation of all of the optical surfaces 10. (The data stored in the memory 22 may be obtained using well-known initialization techniques with a pixelated sensor at the objective pupil 12.) The computer 20 uses this data to trace the path of each ray in a bundle of rays 24 received at the input aperture 26 of the optical system comprising the optical surfaces 10. From this optical ray tracing, the computer 20 computes the sensitivity of the optical path length of each ray to each deformation or element in the error vector $\bar{x}$ representing all of the optical surfaces 10. The process by which the computer 10 accomplishes this is discussed in further detail in the Working Example given below in this specification. The computer forms an ordered array of all such sensitivities to produce a sensitivity or C matrix.

An actuator response matrix computer 28 retrieves from a memory 30 the actuator design data specifying the location, orientation and operating characteristics of all of the actuators 16 controlling the optical surfaces 10. The computer 28 uses this data to compute the exact responsivity of individual components of the error vector $\bar{x}$ to control vectors governing individual ones of actuators 16. The manner in which the computer 28 accomplishes this is described in detail below. The computer 28 forms an ordered array of these responsivities to produce an actuator response or A matrix.

A wavefront error computer 32 computes from the C matrix and the A matrix certain quantities (namely, $[A^T C^T CA]^{-1}$ and $A^T C^T$) from which the total wavefront error at the exit pupil 12 can be computed from the error vector. These quantities together comprise an actuator gain matrix and are derived by satisfying the exact condition for minimizing the total wavefront error at the objective pupil 12, as will be described below. An actuator command computer 34 combines these quantities (the actuator gain matrix) with the error vector $\bar{x}$, producing an actuator command vector $\bar{u}$ which defines the simultaneous optimum actuator commands for all the actuators 16 which minimize the total wavefront error at the objective pupil 12. The computers 32 and 34 may be thought of as a single real time feedback control computer 36. In fact, all of the computers 20, 28 and 36 may be implemented in a single computer or processor system. The individual control commands contained in the vector $\bar{u}$ are applied to corresponding ones of the actuators 16. Digital-to-analog converters (not shown) may be employed to transform the digital outputs of the computer 34 to the appropriate analog voltages required to effect the mechanical control excersized by each actuator 16.

The advantages of the feedback control system of FIG. 1 include extremely high speed: each time the sensors 14 sample the error states of the optical surfaces 10, a single one-step calculation of the optimum actuator commands is performed. This calculation consists in multiplying the measured error vector by the gain matrix. Also, the result is exact: the gain matrix produced by the computer 32 produces an exact minimization of the total wavefront error at the objective pupil 12. The invention thus provides the first high-speed exact feedback control for complex optical systems.

In one embodiment of the invention, the converter/estimator 18 may provide estimates of the measurements of the errors in $\bar{x}$ by the sensors 10 based upon a measurement matrix H whose construction and use by the converter/estimator 18 is described below in detail.

In some implementations of the invention, the commanded movement of the actuators 16 may so change the geometrical relations among the optical surfaces 10 as to require that the sensitivity matrix be recomputed by the computer 20 based upon a modification of the initial geometry data describing the optical surfaces 10. The modification to the initial geometry data is performed by an optical geometry change computer 38. The computer 38 receives the error data from the converter/estimator 18 and the initial geometry data from the memory 22 and updates the initial geometry data using the error data to generate a new set of geometry data. The computer 38 transmits this new set of geometry data to the sensitivity matrix generating computer 20, which generates an updated C matrix therefrom.

WORKING EXAMPLE

INTRODUCTION TO WORKING EXAMPLE

The NASA Precision Segmented Reflector (PSR) program is developing technologies to enable the flight of large spaceborne astronomical telescopes starting sometime around the turn of the century. Much of the current activity centers on the PSR Focus Moderate Mission Telescope (FMMT), a medium-sized (3.65 m aperture) space-based submillimeter-wave telescope which exemplifies many of the technical difficulties that must be overcome.

The example addresses the problem of figure maintenance control for the FMMT primary mirror, which is formed of seven separate segments. Figure maintenance control is used when the ideal configuration of the panels with respect to each other is known. It uses sensors that directly sense motions of the panels to determine their errors relative to the ideal state. These errors are corrected by actuators that rotate and translate the panels. Figure initialization control is the process of determining the ideal configuration for the panels and moving them there, using a science detector. By looking at known bright calibration stars, the panels are moved to maximize the image quality directly.

Figure maintenance is used between initializations to hold the figure of the mirror steady while taking science data. It is intended to counter the long-term thermal drifts that the structure experiences. For the FMMT, these errors are expected to be 10-200 microns at the segment centers over the course of a single orbit. They occur on a relatively long time scale, typically tens of minutes. Consequently, the FMMT figure maintenance controller has a low bandwidth on the order of 0.1 Hz.

The FMMT also experiences vibrational disturbances due to the presence on the structure of vibrating machinery, such as reaction wheels and a secondary mirror chopping mechanism. These are low amplitude, high frequency effects, causing segment motions of 0.01-0.08 microns peak at frequencies ranging from 0.5-500 Hz. They are not affected by the figure maintenance controller, being beyond its effective bandwidth. They are passed through directly to the panels causing acceptable levels of image jitter.

The objective of the FMMT figure maintenance controller is to maximize the optical quality of the entire telescope with respect to primary mirror segment position errors. It does this by moving the primary mirror segments to cancel optical aberrations induced on the wavefront by rotational and translational disturbances of the segments. Our controller uses an accurate mathematical model of the FMMT optics to compute the control that minimizes the wavefront error of the telescope. This differs from previous work, which seeks to minimize segment position errors directly, without accounting for their effect on the ultimate imaging performance of the telescope.

We treat the FMMT as a quasi-static system, which is appropriate given the long time-scale of the thermal disturbances as compared to the maintenance control bandwidth. We consider only the six outer segments, using the center segment as a reference for the rest. We neglect the effects of segment surface distortions and motions of other optical elements, though these can easily be included in the analysis if desired. We concentrate on identifying the basic limiters of performance for figure control systems: controllability, observability, actuator and sensor noise. We address these and other issues in the context of the FMMT, but the methods we use, and the conclusions we draw, can be applied to any segmented-mirror telescope.

DESCRIPTION OF THE FMMT

Figure 2:
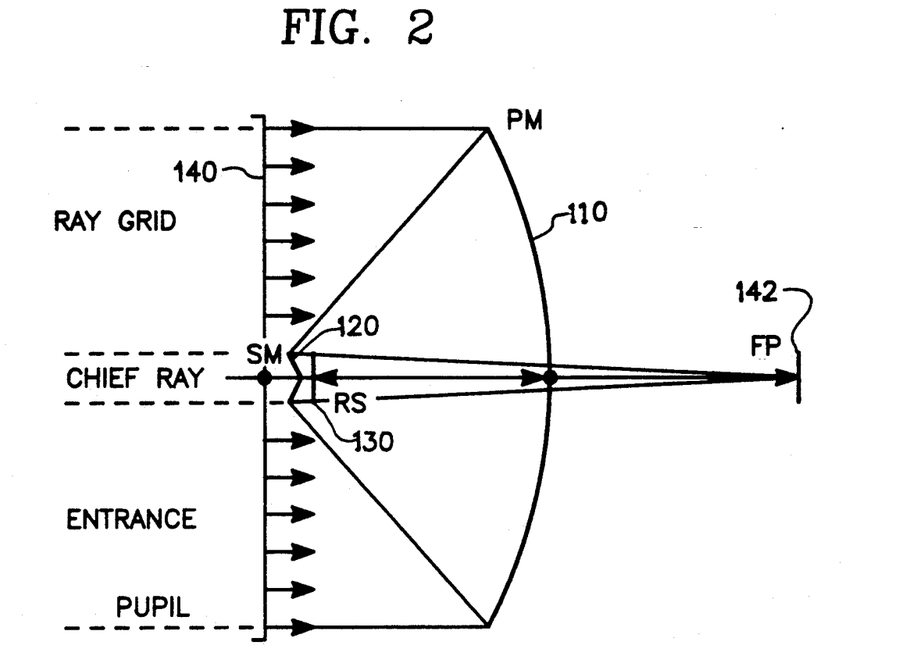
FIGS. 2 and 3 illustrate a particular optical system in which the invention is employed.

Referring to FIG. 2, the FMMT main optics form an $f/10$ Cassegrain telescope, consisting of a very fast $f/0.4$ segmented parabolic primary mirror 110 and a hyperbolic secondary mirror 120. The FMMT also uses 1:1 relay optics to reimage the light in a cryogenic dewar which contains the pixillated science detectors (not shown). Currently, we compute the pupil function of the system at the spherical reference surface (RS) 130 located just past the secondary mirror 120. The reference surface 130 is aligned with the nominal spherical wavefront 140 of the unperturbed system. One of the baseline science detectors in the focal plane 142 (FP) is a 10×10 bolometer array which is sensitive in the 100-300 $\mu$m wavelengths of light. This bolometer is used by the initialization controller in the initial phasing of the panels, as well as to collect astronomical science data.

The primary mirror 110 is supported by a trusswork backplane structure (not shown) constructed of high stiffness, low thermal coefficient-of-expansion members and consists of mirror segments $S_1$, $S_2$, $S_3$, $S_4$, $S_5$, $S_6$ and $S_7$. These segments attach to the nodes of the truss and are influenced by motions of the nodes. The thermal and other slow motions of the optics are expected to be between 10-235 $\mu$m and 10-200 $\mu$rad over the maintenance cycle.

Figure 3:
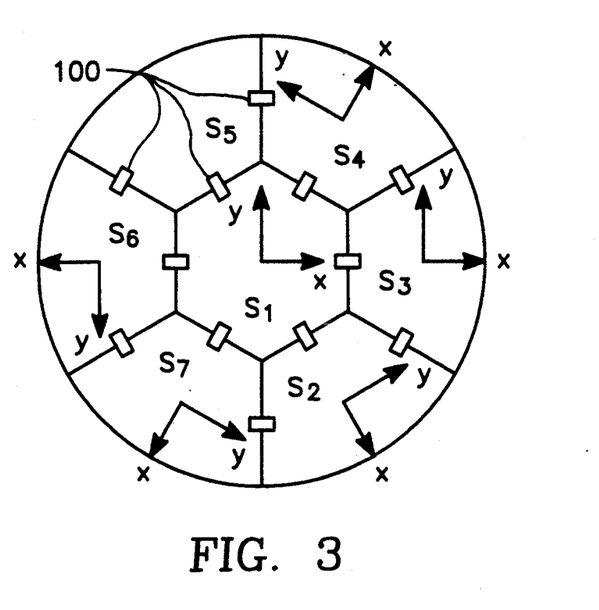
Figure 4:
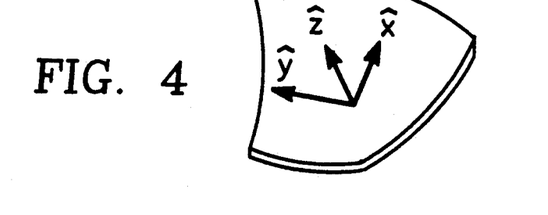
FIG. 4 illustrates the coordinate system for each individual optical segment employed in the system of FIGS. 2 and 3.

Each segment panel $S_2$, $S_3$, $S_4$, $S_5$, $S_6$ and $S_7$ is separately actuated in three degrees of freedom. This is accomplished using three linear actuators 100 for each segment panel acting in the segment z-axis at the three segment attach points. For this analysis we resolve the three available control degrees of freedom into tip (rotation about the local y-axis); tilt (rotation about x); and piston (translation along the local z-axis) commands acting at the center of the panels. The segment actuator coordinates are centered in each panel with the x-axis pointing radially away and tangent to the surface, z-axis along the normal, and the y-axis forming a tangent in the circumferential direction (FIGS. 3 and 4). One-sigma actuator noise levels are expected to result in approximately 350 nm error in piston and 350 nrad in tip and tilt. The three uncontrolled degrees of freedom per panel consist of x- and y-decenter (translation along x or y) and twist (rotation about z).

Also indicated on FIG. 3 are the locations of figure sensors for one candidate sensor configuration. Two types of figure sensors are used in this analysis. Edge-sensors 100a use an array of four laser interferometers 102 to directly measure relative piston (z-axis translation) and hinge angle (x-axis rotation) between two segments, as indicated on FIG. 5. Gap sensors 100b using interferometric, inductive or capacitive devices can be used to measure relative displacements in the y-axis direction. One-sigma measurement noise of about 1 nm in piston and gap was assumed; hinge angle noise of about 1 nrad was also assumed.

MODELLING

The first step in creating a controller of this type is to formulate the objective function in terms of the error states and the control variables. In our case, the objective function is wavefront error squared at the exit pupil, the error states are the 6 degrees of freedom (DOF) rotational and translational motions of the six outer segments, and the controls are the 3 DOF (tilt, tip and piston) actuators of each segment. The second step is to take the derivatives of the objective function with respect to the error states and control variables. These derivatives provide a linear model of the influence of the errors and controls on the objective. The third step is to invert the linear model (in the least-squares sense) to obtain expressions for the control in terms of the errors, as weighted by the error contribution to the objective function. The result is the optimal control gain, i.e. the control that minimizes the objective function.

A similar process is followed to create an estimator for processing segment figure sensor measurements into segment error state estimates. Here we start by expressing the sensor measurements as a linear function of the segment state errors using the kinematics of the FMMT structure. This measurement equation is linearized and inverted (using weighted least-squares) to obtain equations for estimator gains, giving segment state errors as a linear function of sensor measurements.

In most of this analysis we treat the FMMT as a quasi-static system. We consider the errors to be initial-condition errors and we neglect structural and thermal dynamics. In the case of the thermal disturbances, the time scale is so slow compared to segment servo dynamics. In the case of the thermal disturbances, the time scale is so slow compared to segment servo dynamics that the controller is well approximated as a periodic single-stage controller without dynamics. As for the structural vibrational disturbances, they occur so fast compared to the maintenance controller bandwidth that they pass through unimpeded.

The wavefront error is best modelled using ray-trace optics. Ray-tracing treats light beams as bundles of straight-line rays. Each ray is broken into segments, with direction changes occurring at reflective and refractive surfaces. For the FMMT, we trace a bundle of n (a large number) collimated rays starting at the entrance pupil. This represents the light from a point object at infinity (not a band approximation to a distant star). We follow each ray as it hits one of the primary mirror segments, then the secondary mirror, and then finally the spherical reference surface, which has its center of curvature at the nominal focal point. In the nominal case, the pathlength of each ray is exactly the same. When the system is perturbed, the length of some of the rays will change. Differencing the perturbed and nominal pathlengths gives the ray OPDs (optical path differences) at the reference surface. The OPDs in turn determine the phase of the complex pupil function at the reference surface. The focal plane image is determined by propagating the wavefront determined by the pupil function to the focal plane using physical optics techniques. System image quality is indicated by the RMS wavefront error computed directly from the OPDs.

To compute the ray-trace models we follow the analysis of Redding et al., "Linearized Ray-Trace Analysis," *International Lens Design Conference*, June, 1990, which provides a full ray-trace analysis that can be performed inline with other computer programs, or separately on a stand-alone basis. We use a linearized model of the FMMT set up by directly calculating the partial derivatives of the rays at the reference surface with respect to the segment states and control actions, to determine controllability and observability of the controller, and to perform covariance analyses. The mathematics are summarized briefly in the next few paragraphs.

Figure 6:
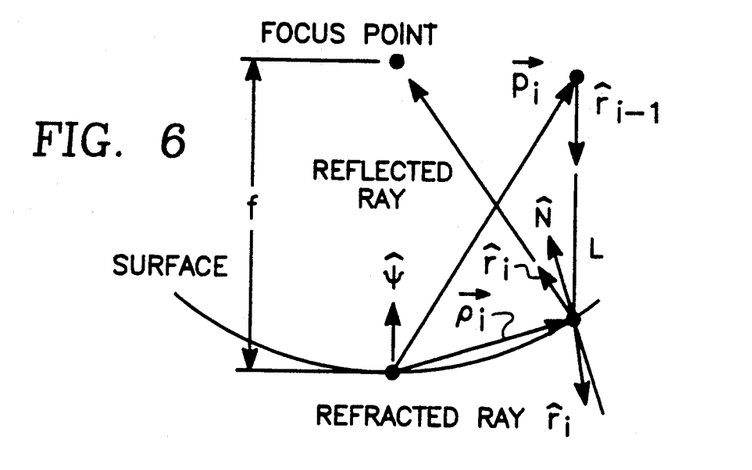
FIG. 6 illustates the exact ray-trace optical geometry employed in formulating the sensitivity matrix in one embodiment of the invention.

The analysis represents the i-1 ray segment in terms of its starting point $\vec{p}_i$ to the vertex of the $i^{th}$ surface, its direction $\hat{r}_{i-1}$, and its length $L_{i-1}$ (see FIG. 6). Starting at $\vec{p}_i$, the ray proceeds in the direction $\hat{r}_{i-1}$ until it hits the $i^{th}$ surface. Conic surfaces are represented by a dyad M and a vector $\vec{N}_0$, which are functions of the geometric focal length f, eccentricity e and principal axis direction $\hat{\psi}$ $$M = (I - e^2 \hat{\psi}\hat{\psi}) \tag{1}$$

$$\vec{N}_0 = -f\hat{\psi} \tag{2}$$

The distance travelled to the surface is given by $L_i$, which is a solution of $$(\hat{r}_{i-1} \cdot M \cdot \hat{r}_{i-1})L_i^2 + 2\hat{r}_{i-1} \cdot (M \cdot \vec{p}_i + \vec{N}_0)L_i + \vec{p}_i \cdot (M \cdot \vec{p}_i + 2\vec{N}_0) = 0 \tag{3}$$

The point of incidence on the surface is given by $$\vec{p}_i = \vec{p}_i + L_i \hat{r}_{i-1} \tag{4}$$

$\vec{p}_i$ is the starting point for the next ($i^{th}$) ray segment: the process repeats until the ray reaches the last surface. The direction of the ray reflected from the surface is given by $$\hat{r} = R \cdot \hat{i} \tag{5}$$

where R is the "reflection dyadic"

$$R = I - 2\hat{N}\hat{N} \tag{6}$$

and the normal at the point of incidence is $$\hat{N} = \text{unit } (\vec{N}_0 + M\vec{p}_i) \tag{7}$$

Figure 7:
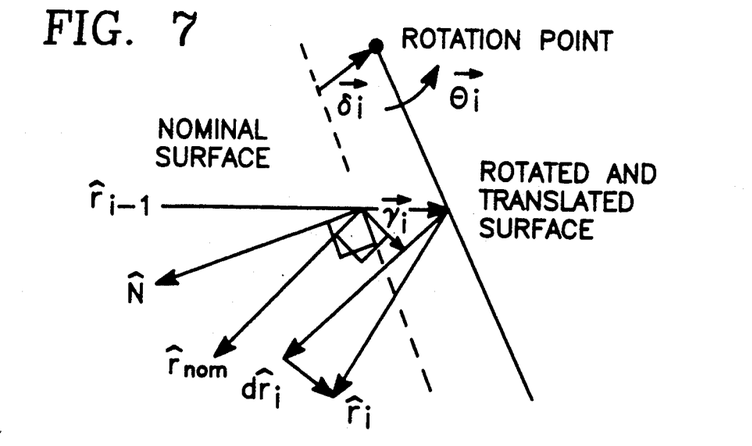
FIG. 7 illustrates the geometry corresponding to FIG. 6 employed to define perturbations in the optical paths in the system due to deformations of the various optical segments.

The effect of perturbations either in the incoming ray or in the surface attitude and position is to change the outgoing ray state. Perturbed rays are represented in terms of small ray direction perturbations $d\hat{r}$, transverse aberration or "beamwalk" $\hat{y}$, and the optical path difference (OPD) dL (FIG. 7). The Redding et al. publication presents closed-form equations for the derivatives of ray states with respect to perturbations of the incident ray and of the surface perturbations $\vec{\theta}$ (rotation) and $\vec{\delta}$ (translation). These derivatives are chained to develop a linearized model of the complete optical system. For the FMMT we are concerned with the OPD at the exit pupil only. The linear model takes the form $$\vec{w}_0 = C \vec{x}_0 \tag{8}$$

Here e,rar/w/$_0$ is a vector of n ray OPDs, and $\vec{x}$ is the error state, composed of six 6-vectors $\vec{x}_{segi}$ (one for each of the outer segments). We take the $\vec{x}_{segi}$'s to be in segment coordinates, so that each is in the form $$\vec{x}_{segi} = [\theta_x, \theta_y, \theta_z, \delta_x, \delta_y, \delta_z]^T. \tag{9}$$

$\theta_x$, $\theta_y$ and $\theta_z$ are rotations about the x, y and z axes while $\delta_x$, $\delta_y$ and $\delta_z$ are rotations about the x, y and z axes of the corresponding segment.

C is thus an array of partial derivatives relating the ray OPDs to element perturbations:

$$C = \begin{bmatrix} \frac{\partial L_{ray1}}{\partial \vec{\theta}_{seg2}} & \cdots & \frac{\partial L_{ray1}}{\partial \vec{\delta}_{seg7}} \\ & & \\ \vdots & & \vdots \\ & & \\ \frac{\partial L_{ray1}}{\partial \vec{\theta}_{seg2}} & \cdots & \frac{\partial L_{ray1}}{\partial \vec{\delta}_{seg7}} \end{bmatrix} \quad (10)$$

Two other linear models are required in the derivation of the controller. The first is the control action matrix A, which scales actuator motions u directly into segment coordinates. A is a 36 by 19 matrix which simply projects the three controls (tip $\theta_x$, tilt $\theta_y$ and piston $\delta_z$) into segment coordinates. u is the control vector made up of the six individual segment controller vectors $\vec{u}_{segi}$, where each $\vec{u}_{segi}$ is $$\vec{u}_{segi} = \begin{matrix} \theta_x \\ \theta_y \\ \delta_z \end{matrix} \quad (11)$$

Given that the controls act along the segment coordinates, the 6 by 3 A matrix for one segment is $$A_{segi} = \begin{bmatrix} \hat{x}_{segi} & \hat{u}_{segi} & 0 \\ & & 0 \\ & & 0 \\ 0 & 0 & \\ 0 & 0 & \hat{z}_{segi} \\ 0 & 0 & \end{bmatrix} \quad (12)$$

The full A matrix is $$A = \begin{bmatrix} A_{seg2} & 0 & 0 \\ 0 & \cdot & 0 \\ 0 & 0 & A_{seg7} \end{bmatrix} \quad (13)$$

The effect of actuator motions in segment state coordinates is $$\vec{x}_{act} = A\vec{u} \quad (14)$$

Adding the effect of actuator motions to those of the segment errors, the total wavefront error is $$\vec{w}_1 = \vec{w}_0 + CA\vec{u} = C\vec{x}_0 + CA\vec{u} \quad (15)$$

The controller objective function is the total wavefront error squared:

$$J = \vec{w}_1^T \vec{w}_1 \quad (16)$$

Figure 5:
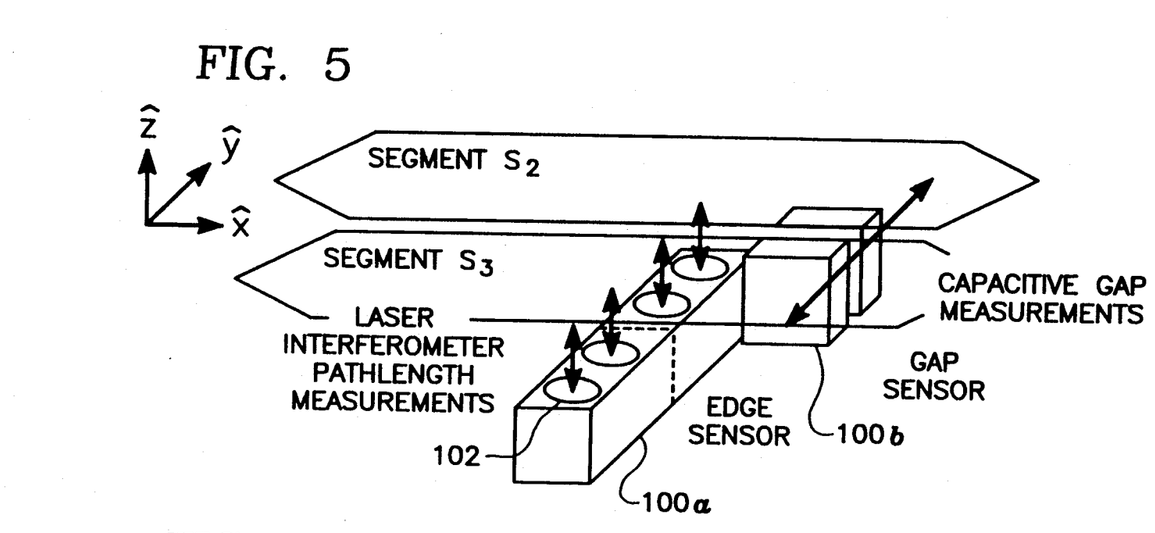
FIG. 5 illustrates the two types of sensors employed in the system of FIGS. 2 and 3 to measure movement or deformation of each optical segment.

The last part of the modeling task is the derivation of the measurement equations. These depend on the particular sensor configuration, and we will consider several. All use the same basic elements: edge sensors 100a and gap sensors 100b located between adjacent panels (FIG. 5). The edge sensors 100a use laser interferometers configured to measure two degrees of freedom between the two segments: relative piston (local z translation) and relative tilt (local x or y rotation), as sketched in FIG. 5. The gap sensors 100b are capacitive devices that, when used, are mounted in pairs at the same locations as the edge sensors. They provide measurements of relative gap (local x or y translation) (FIG. 5). Both sensor systems can provide excellent performance, yielding accuracies in the nanometers and nanoradians.

Direct derivation of the linearized measurement equations is straight-forward. In general, the form of the measurement equation is $$z = Hx \quad (17)$$

Figure 8:
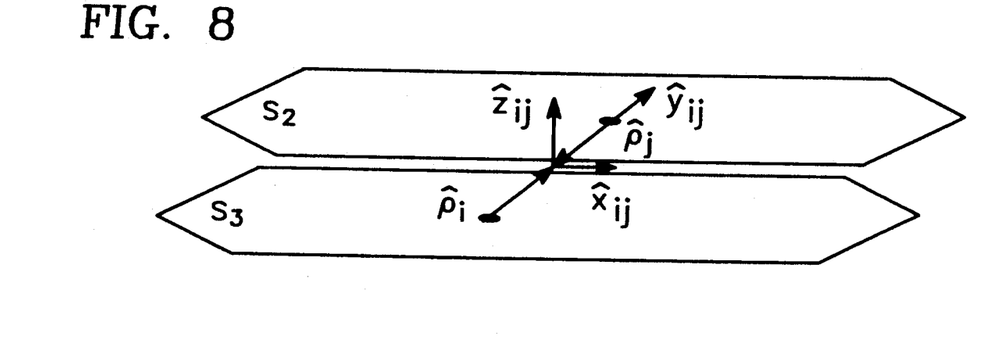
FIG. 8 illustrates the geometry of the deformation sensors between two adjacent segments employed in defining a measurement matrix representing the sensor response employed in accordance with one embodiment of the invention.

As an example, consider the edge and gap sensors between two panels i and j as sketched on FIG. 8. The 3 measurements are formed into the measurement vector $\vec{z}_{ij}$, which is a function of the two segment states $$\vec{z}_{ij} = \begin{bmatrix} \text{hinge angle} \\ \text{piston} \\ \text{gap} \end{bmatrix} = \begin{bmatrix} \frac{\partial \vec{z}_{ij}}{\partial \vec{x}_i} & \frac{\partial \vec{z}_{ij}}{\partial \vec{x}_j} \end{bmatrix} \begin{bmatrix} \vec{x}_i \\ \vec{x}_j \end{bmatrix} \quad (18)$$

The partials are derived by inspection as $$\frac{\partial \vec{z}_{ij}}{\partial \vec{x}_i} = \begin{matrix} -\hat{x}_{ij} & 0 & 0 & 0 \\ \hat{z}_{ij}^T \hat{P}_i^x & -\hat{z}_{ij}^T \\ \hat{y}_{ij}^T \hat{P}_i^x & -\hat{y}_{ij}^T \end{matrix} \quad (19)$$

and $$\frac{\partial \vec{z}_{ij}}{\partial \vec{x}_j} = \begin{matrix} -\hat{x}_{ij} & 0 & 0 & 0 \\ \hat{z}_{ij}^T \hat{P}_j^x & -\hat{z}_{ij}^T \\ \hat{y}_{ij}^T \hat{P}_j^x & -\hat{y}_{ij}^T \end{matrix} \quad (20)$$

The full set of measurement equations for each of the configurations is an elaboration of this simple case, with the measurement vector $\vec{z}$ consisting of the $\vec{z}_{ij}$ from each sensor, and $\vec{x}_0$ being the full error state $$\vec{z} = H\vec{x}_0 + \vec{r}$$

Here $\vec{r}$ is sensor noise. The measurement matrix H is built up of the partials of the measurements as above $$H = \begin{bmatrix} \frac{\partial \vec{z}_{12}}{\partial \vec{x}_1} & \frac{\partial \vec{z}_{12}}{\partial \vec{x}_2} & & \\ & & & \\ & & & \\ & & \frac{\partial \vec{z}_{67}}{\partial \vec{x}_6} & \frac{\partial \vec{z}_{67}}{\partial \vec{x}_7} \end{bmatrix} \quad (21)$$

WAVEFRONT CONTROLLABILITY

In keeping with our use of quasi-static model of the FMMT, we treat the control problem as a single-stage optimal control problem. We derive a control that takes the objective function—the wavefront error squared—to its minimum possible value in a single instantaneous step. This is a good approximation for our system, as the time scale of the control is very short compared to the thermal disturbances. In the real system the control will be implemented using a dynamic controller that takes the panel and actuator dynamics into account. Our intention here is to address the underlying controllability question: Can the segments be controlled to completely eliminate the effects of segments error on the wavefront? The answer is a function of the optics and the system geometry, and is the same for both the quasi-static and dynamic controllers.

The control problem is to minimize the objective function J over the transition from $\vec{w}_0$ to $\vec{w}_1$. We derive the optimal control by finding the value of $\vec{u}$ that renders J stationary, or (in other words) satisfies $dJ=0$ for non-zero values of $d\vec{u}$:

$$dJ = d\vec{w}_1^T \vec{w}_1 = d\vec{u}^T A^T C^T (CA\vec{u} + C\vec{x}_0) = 0 \qquad (22)$$

This condition is satisfied by the control $$\vec{u}_{opt} = -[A^T C^T CA]^{-1} A^T C^T C\vec{x}_0 \qquad (23)$$

The control as implemented includes actuator noise $\vec{q}$, and uses the estimated panel error state $\vec{x}_{est}$. Defining G as the control gain matrix, the control as implemented is $$\vec{u} = -G\vec{x}_{est} + \vec{q} \qquad (24)$$

where $$G = [A^T C^T CA]^{-1} A^T C^T C \qquad (25)$$

The same result can be derived by choosing G to minimize the variance of the residual wavefront error, or as a minimization with the transition equation 24 adjoined to the objective function J as an equality constraint.

Consider the general problem of estimating the segment error states. We start with some initial segment error state $\vec{x}_0$ with covariance $X_0$. The sensor measurement signals $\vec{z}$ are obtained via the measurement equation discussed above $$\vec{z} = H\vec{x}_0 + \vec{r} \qquad (26)$$

where $\vec{r}$ is the measurement noise, characterized as zero-mean noise with covariance R. The particulars of H depend on which sensor configuration is used, as discussed previously. We assume that the previous best estimate of the segment state was zero. The objective function for the weighted least-squares estimate of $\vec{x}_0$ is $$J = (\tfrac{1}{2})[\vec{x}_0^T X_0^{-1}\vec{x}_0 + (\vec{z} - H\vec{x}_0)^T R^{-1}(\vec{z} - H\vec{x}_0)] \qquad (27)$$

By minimizing the wavefront error, the controller maximizes the overall optical quality of the telescope with respect to the modelled degrees of freedom. Other error sources, such as motions of the secondary mirror, relay optics and focal plane, and thermal deformations of the primary mirror segments, also contribute to the overall system performance. The framework can easily be expanded to include all these effects, provided appropriate sensors and actuators are added as well. To realize this, the state vector, which in this paper contained only the six rigid body states of each of six primary reflector panels, would be augmented to include the six secondary mirror rigid body states, the six focal plane rigid body states, and as many primary segment deformation states (e.g., thermal mode shapes) as are deemed important. Similarly, the control vector would be augmented with secondary mirror tip, tilt, x-decenter, y-decenter and focus, and panel deformation control inputs. The measurement vector would be modified to include more samples of the primary segment surfaces, secondary positions and orientations, and focal plane positions and orientations. The basic mathematics of the problem, which yield an optimal control solution for the modelled degrees of freedom, are unchanged from the results presented in this paper.

The controller should outperform any prior art approach with respect to wavefront error. Telescope optical parameters, such as focal ratio and relative segment size, will significantly affect the performance of any controller.

While the invention has been described in detail with specific reference to preferred embodiments thereof, it is understood that variations and modifications may be made without departing from the true scope and spirit of the invention.

What is claimed is:

1. In a complex optical system having a light-receiving aperture, an objective pupil and plural optical surfaces of respective shapes disposed in certain locations and orientations which determine an optical path for each ray in a bundle of rays travelling from said aperture to said objective pupil, said shapes, locations and orientations being subject to perturbations due to external influences from ideal shapes, locations and orientations, respectively, said perturbation corresponding to changes in the optical path of each of said rays, said system further having plural actuator means associated with said plural optical surfaces for changing said locations and orientations in response to an actuator command vector specifying plural commands for said plural actuator means and sensor means for sensing each component of perturbation of the location and orientation of each of said plural optical surfaces, a feedback control system for compensating for said perturbations, said feedback control system comprising:

means for generating from said ideal shapes, locations and orientations a sensitivity matrix which defines, for each ray in said bundle of rays, a sensitivity of its optical path to each component of perturbation of the location and orientation of each of said plural optical surfaces, said sensitivity representing the rate of change of said optical path responsive to a corresponding component of perturbation;

means for generating an actuator response matrix which relates said actuator command vector to corresponding perturbations of said locations and orientations caused by said actuator means in response to said actuator command vector;

means for generating from said sensitivity matrix and from said actuator response matrix a gain matrix by determining a condition whereby a combination of said changes in the optical paths of all of said rays is minimized at the objective pupil; and means for producing an optimum actuator control vector by multiplying by said gain matrix an error vector comprising each component of perturbation in said shapes, locations and orientations of said plural optical surfaces sensed by said means for sensing, and transmitting commands corresponding to said optimum actuator control vector to respective ones of said actuator means so as to control the shapes, locations and orientations of said plural optical surfaces.

2. The system of claim 1 further comprising:

means connected to said means for sensing for providing modifications to said ideal locations and orientations attributable to perturbations in said locations and orientations sensed after said plural actuator means have responded to said actuator control vector; and wherein said means for generating comprises means for modifying said sensitivity matrix in response to said modifications to said locations and orientations.

3. The system of claim 1 wherein said perturbations are defined with respect to orthogonal basis vectors and wherein said sensitivity matrix is an orthogonal matrix C, said actuator response matrix is an orthogonal matrix A, said error vector is a vector $\bar{x}$, said actuator control vector is a vector $\bar{u}$, and wherein said means for generating a gain matrix comprises means for determining how to minimize a total wavefront error $[C(\bar{x}+A\bar{u})]^T[C(\bar{x}+A\bar{u})]$.

4. The system of claim 3 wherein said means for producing a gain matrix produces the following gain matrix: $[A^T C^T C A]^{-1}[A^T C^T]$.

5. A complex optical system having a light-receiving aperture, an objective pupil and plural optical surfaces of respective shapes disposed in certain locations and orientations which determine an optical path for each ray in a bundle of rays travelling from said aperture to said objective pupil, said shapes, locations and orientations being subject to perturbations due to external influences from ideal shapes, locations and orientations, respectively, said perturbation corresponding to changes in the optical path of each of said rays, said system comprising:

plural actuator means associated with said plural optical surfaces for changing said locations and orientations in response to an actuator comand vector specifying plural commands for said plural actuator means;

means for sensing each component of perturbation of the location and orientation of each of said plural optical surfaces;

means for generating from said ideal shapes, locations and orientations a sensitivity matrix which defines, for each ray in said bundle of rays, a sensitivity of its optical path to each component of perturbation of the location and orientation of each of said plural optical surfaces, said sensitivity representing the rate of change of said optical path responsive to a corresponding component of perturbation;

means for generating an actuator response matrix which relates said actuator command vector to corresponding perturbations of said locations and orientations caused by said acutator means in response to said actuator command vector;

means for generating from said sensitivity matrix and from said actuator response matrix a gain matrix by determining a condition whereby a combination of said changes in the optical paths of all of said rays is minimized at the objective pupil; and means for producing an optimum actuator control vector by multiplying by said gain matrix an error vector comprising each component of perturbation in said shapes, locations and orientations of said plural optical surfaces sensed by said means for sensing, and transmitting commands corresponding to said optimum actuator control vector to respective ones of said actuator means so as to control the shapes, locations and orientations of said plural optical surfaces.

6. The system of claim 5 further comprising:

means connected to said means for sensing for providing modifications to said ideal locations and orientations attributable to perturbations in said locations and orientations sensed after said plural actuator means have responded to said actuator control vector; and wherein said means for generating comprises means for modifying said sensitivity matrix in response to said modifications to said locations and orientations.

7. The system of claim 5 wherein said perturbations are defined with respect to orthogonal basis vectors and wherein said sensitivity matrix is an orthogonal matrix C, said actuator response matrix is an orthogonal matrix A, said error vector is a vector $\bar{x}$, said actuator control vector is a vector $\bar{u}$, and wherein said means for generating a gain matrix comprises means for determining how to minimize a total wavefront error $[C(\bar{x}+A\bar{u})]^T[C(\bar{x}+A\bar{u})]$.

8. The system of claim 7 wherein said means for producing a gain matrix produces the following gain matrix: $[A^T C^T C A]^{-1}[A^T C^T]$.

9. A method of maintaining a complex optical system having a light-receiving aperture, an objective pupil and plural optical surfaces of respective shapes disposed in certain locations and orientations which determine an optical path for each ray in a bundle of rays travelling from said aperture to said objective pupil, said shapes, locations and orientations being subject to perturbations due to external influences from ideal shapes, locations and orientations, respectively, said perturbation corresponding to changes in the optical path of each of said rays, said system having plural actuator means associated with said plural optical surfaces for changing said locations and orientations in response to an actuator command vector specifying plural commands for said plural actuator means:

generating from said ideal shapes, locations and orientations a sensitivity matrix which defines, for each ray in said bundle of rays, a sensitivity of its optical path to each component of perturbation of the location and orientation of each of said plural optical surfaces, said sensitivity representing the rate of change of said optical path responsive to a corresponding component of perturbation;

generating an actuator response matrix which relates said actuator command vector to corresponding perturbations of said locations and orientations caused by said actuator means in response to said actuator command vector;

generating from said sensitivity matrix and from said actuator response matrix a gain matrix by determining a condition whereby a combination of said changes in the optical paths of all of said rays is minimized at the objective pupil;

sensing each component of perturbation of the location and orientation of each of said plural optical surfaces;

producing an optimum actuator control vector by multiplying by said gain matrix an error vector comprising each component of perturbation in said shapes, locations and orientations of said plural optical surfaces sensed by said means for sensing, and transmitting commands corresponding to said optimum actuator control vector to respective ones of said actuator means so as to control the shapes, locations and orientations of said plural optical surfaces.

10. The method of claim 9 further comprising:
computing, from perturbations in said locations and orientations sensed after said plural actuator means have responded to said actuator control vector, modifications to said ideal locations and orientations; and
modifying said sensitivity matrix in response to said modifications to said locations and orientations.

11. The method of claim 9 wherein said perturbations are defined with respect to orthogonal basis vectors and wherein said sensitivity matrix is an orthogonal matrix C, said actuator response matrix is an orthogonal matrix A, said error vector is a vector $\bar{x}$, said actuator control vector is a vector $\bar{u}$, and wherein said step of generating a gain matrix comprises determining how to minimize a total wavefront error $[C(\bar{x}+A\bar{u})]^T[C(\bar{x}+A\bar{u})]$.

12. The method of claim 11 wherein said step of producing a gain matrix produces the following gain matrix:

$[A^T C^T C A]^{-1}[A^T C^T C]$.

* * * * *